United States Patent
Pavlov et al.

(10) Patent No.: US 9,122,841 B2
(45) Date of Patent: Sep. 1, 2015

(54) PROVIDING REMOTE APPLICATION LOGS FOR CLOUD APPLICATIONS

(71) Applicants: Vladimir Pavlov, Sofia (BG); Hristo Iliev, Sofia (BG); Verzhiniya Noeva, Sofia (BG); Hristo Kostov, Sofia (BG); Petar Zhechev, Sofia (BG)

(72) Inventors: Vladimir Pavlov, Sofia (BG); Hristo Iliev, Sofia (BG); Verzhiniya Noeva, Sofia (BG); Hristo Kostov, Sofia (BG); Petar Zhechev, Sofia (BG)

(73) Assignee: SAP SE, Walldorf (DE)

( * ) Notice: Subject to any disclaimer, the term of this patent is extended or adjusted under 35 U.S.C. 154(b) by 103 days.

(21) Appl. No.: 13/652,514

(22) Filed: Oct. 16, 2012

(65) Prior Publication Data
US 2014/0109188 A1   Apr. 17, 2014

(51) Int. Cl.
*G06F 15/16* (2006.01)
*G06F 17/30* (2006.01)
*H04L 29/06* (2006.01)
*G06F 11/30* (2006.01)
*G06F 21/00* (2013.01)

(52) U.S. Cl.
CPC ............... *G06F 21/00* (2013.01); *G06F 11/30* (2013.01)

(58) Field of Classification Search
USPC .......... 726/2–8; 713/168–174, 182–186, 202; 709/206, 225, 229, 249, 389
See application file for complete search history.

(56) References Cited

U.S. PATENT DOCUMENTS

| | | | |
|---|---|---|---|
| 2010/0115614 A1* | 5/2010 | Barile et al. | 726/22 |
| 2013/0179450 A1* | 7/2013 | Chitiveli | 707/737 |
| 2013/0298183 A1* | 11/2013 | McGrath et al. | 726/1 |
| 2014/0059226 A1* | 2/2014 | Messerli et al. | 709/226 |

* cited by examiner

*Primary Examiner* — Evans Desrosiers

(57) ABSTRACT

Applications and their application components are deployed on a cloud platform. The application components generate application logs on the underlying cloud runtime infrastructure of the cloud platform. In one aspect, the application logs may be stored on a network storage on the cloud platform. In another aspect, the application logs may be stored on the cloud runtime infrastructure. The cloud platform provides a service that exposes an interface to remotely provide the stored application logs. The exposed interface is instantiated to process remote requests for application logs for a specified application component. The remote requests are sent from a client. The requested application logs are retrieved based on the implementation of the interface. The application logs are provided to the client.

16 Claims, 6 Drawing Sheets

PROVIDING REMOTE APPLICATION LOGS FOR CLOUD APPLICATIONS

BACKGROUND

The increasing software complexity results in changes to product cycles, requirements and models for delivering software applications. Changes in customers' needs require flexibility in terms of processes, landscape and software components. Operational costs are high and a lot is spent on maintenance of the existing infrastructural equipment. Traditionally, business customers have to build and maintain their own infrastructure to run on-premise applications. Cloud computing is the delivery of computing resources as a service over a network (e.g., the Internet). By applying the Software-as-a-Service (SaaS) model and offering business applications that are hosted online, the maintenance costs decrease and time is saved. Software vendors can use the cloud environment to quickly deploy existing software solutions. SaaS is a delivery model, where a cloud service provider provides software applications and various hardware and software resources on-demand when requested by an end user (e.g., customer). A customer of on-demand applications is free from the procurement and maintenance of the hardware and software needed for executing the applications.

Platform-as-a-Service (PaaS) is another category of cloud computing solutions that provides the computing platform including operating system, programming language execution environment, database, and web server to facilitate the development and deployment of on-demand applications and services. In PaaS offerings, the customer is responsible for more of the execution environment than in the SaaS model. However, with PaaS offerings the customer has greater control over the application. Applications can run as SaaS on the infrastructure that is used with a PaaS provider. Another level of cloud-computing solution is Infrastructure-as-a-Service (IaaS), in which the service provider offers computing resources in the form of physical or virtual machines, data storage, networks, load balancers, etc. In some cases, the customer provides applications to be executed, possibly along with operating system images and other portions of the execution runtime environment.

Application developers or users of cloud-based applications need access to the underlying infrastructure to perform certain operations. This way, they can have a similar experience to what they have when working with on-premise solutions. Direct access to the underlying infrastructure (e.g. virtual machines (VMs) with operating systems and application servers installed on top of them) in a PaaS environment is usually given to a defined number of users, such as platform operators. Monitoring systems help administrators to identify resource bottlenecks or problems and take the required action. During the development phase, it is a common practice to insert logging statements within the code to produce informative logs at runtime that can be helpful for troubleshooting or for analysis purposes.

Logging is a process of creating and storing permanent records of events for a particular system or software application that can be reviewed, printed, and analyzed. These records can contain short messages, the source of the records, timestamps of the events, log levels specifying the importance of the records, etc. Log messages can include a detailed sequence of statements that describe the events happening during an operation as they are executed. Logger objects have predefined levels that specify the granularity that will be applied when logging messages in the log files. A logging configuration can be defined for a particular software application or component. The logging configuration defines the log levels that will be applied while the software application or component is running Java® logging framework is a logging package for the Java® Platform that defines a couple of log levels for a logger object, e.g., fatal, error, warning, info, debug, trace, others. Based on the log level and the events that occur during the execution of the application, log messages are generated and stored as logged data (e.g. in log files). Log messages can be used not only by application developers, but also by the system administrators that identify problems in system operations. Therefore, it is essential to keep logs during the whole execution of a given software application or a system. To retrieve the logged data for an application deployed on a cloud platform, the underlying cloud infrastructure should be accessed.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for providing remote application logs for cloud applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Monitoring application servers and application components that run on top of the servers is a process that is important for on-premise and on-demand solutions. Software applications that are offered as SaaS are deployed on a given cloud platform and run on data centers operated by a cloud vendor. As more and more applications are offered as services, the need for maintenance of these applications increases. Application developers need to monitor the applications during runtime and therefore need access to the stored application logs when troubleshooting customer's problems. However, when an application is deployed on a cloud platform, the cloud runtime infrastructure cannot be directly accessed by the application developer. Thus, application developers should be enabled to remotely preview relevant application logs to easily analyze the behavior of running applications. In addition, application developers need to access this logging information without the additional assistance from cloud platform operators.

Figure 1:
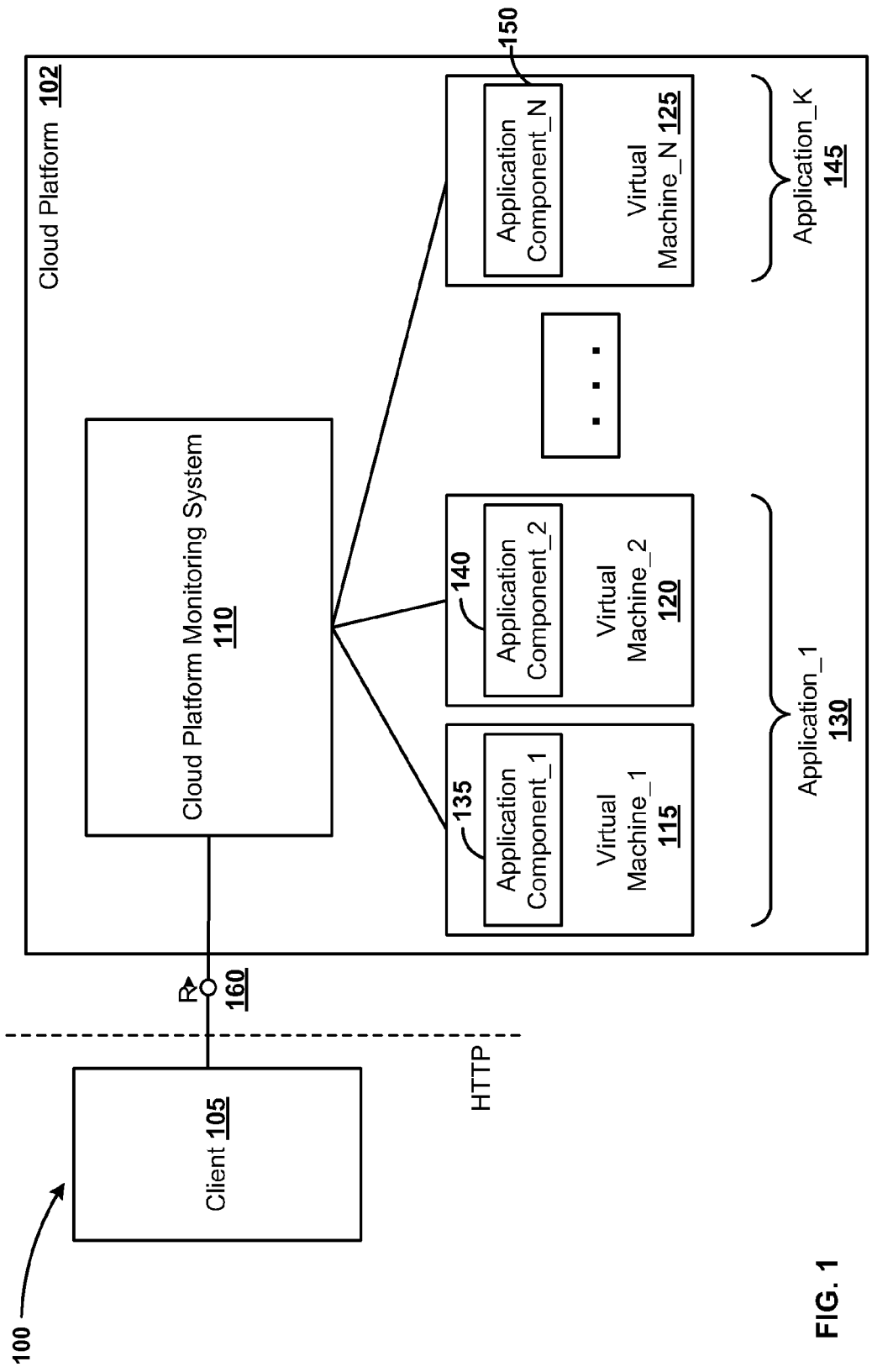
FIG. 1 is a block diagram illustrating an embodiment of an environment for retrieving remote application logs for application components deployed on a cloud platform.

FIG. 1 is a block diagram illustrating an embodiment of an environment 100 for retrieving remote application logs for application components deployed on a cloud platform 102. A client 105 accesses a Cloud Platform Monitoring System 110 with a request to preview the remote application logs for requested application components deployed on a cloud platform. In one embodiment, the Cloud Platform Monitoring System 110 may provide a service to retrieve application logs for platform-deployed components on the cloud platform 102. The Cloud Platform Monitoring System 110 can be associated with the runtime platform infrastructure that is used for running software applications on top of the cloud platform 102. In one embodiment, the runtime platform infrastructure may include virtual machines (VMs) that are used for the deployed application components to run. In one embodiment, the VMs represent the cloud runtime infrastructure provided by the cloud platform to the customers of the platform. For example, customers may be development organizations that develop and provide software applications to end users. The software applications can be provided as services when defined, deployed, and started on top of PaaS offerings, such as the cloud platform 102. The VMs may include Virtual Machine_1 115, Virtual Machine_2 120, Virtual Machine_N 125, etc. Different applications with their application components can be deployed and started on the VMs. For example, Application_1 130 includes two components—Application Component_1 135 and Application Component_2 140. The Application Component_1 135 and Application Component_2 140 are deployed and started on the Virtual Machine_1 115 and the Virtual Machine_2 120. Furthermore, there can be an application, such as Application_K 145, that includes only one application component— Application Component_N 150, which runs on the Virtual Machine_N 125. The application components run on servers that are installed on the VMs. In one embodiment, the server can be an application server which may be a Java® application server for executing Java®-based applications. The servers store log messages while the application components are running. The log messages can be monitored to determine critical issues in the execution of an application component. In addition, log messages help application developers to distinguish the particular problem that is causing the issues. When an issue appears, the stored logs with the log messages can be displayed. Analyzing the performance of the software application or components with the assistance of the log messages can specify the problem area in the software application. In addition, if additional data is needed for the resolution of a problem, the logging configuration can be changed. Thus, after changing the logging configuration and performing a particular task with the software application, the recorded logs will contain different log messages reflecting the new configuration.

In one embodiment, the request sent from the client 105 can specify which application components are monitored and request the stored logged data for them. For example, the client 105 can be a web application for providing information about deployed application components on the cloud platform 102. Another example of the client 105 can be an Integrated Development Environment (IDE) that provides the option of a software developer to access the Cloud Platform Monitoring System 110. The IDE can be the Eclipse® development environment which could be used to develop applications in various programming languages, such as, but not limited to, Java®, Perl®, C®, C++®, PHP®, etc. Furthermore, the client 105 can be a plug-in in the Eclipse® development environment. Yet another example of the client 105 can be a command-line console client that a user can use to enter commands. The command-line console client can be designed to communicate with the Cloud Platform Monitoring System 110. In one embodiment, the client 105 can be provided by the cloud platform 102.

In one embodiment, the cloud platform 102 can provide platform accounts that can be used by clients, such as the client 105. In one embodiment, an account can be a logical entity for separation, such as an account that a customer of a cloud platform can receive. For example, customers can use the account for their own business needs and use a cloud provided space for the account for creating different applications. The cloud provided space may be a repository, or storage. One account can use one space for a number of applications deployed and started on the cloud platform. The applications can also include a number of application components.

The request from the client 105 can be received over a remote communication channel 160. For example, the communication channel can be based on Hypertext Transfer Protocol (HTTP). The Cloud Platform Monitoring System 110 can retrieve remote application logs (e.g. logged data) for the requested application components from the application components deployed and started on VMs, e.g. Virtual Machine_1 115, Virtual Machine_2 120, Virtual Machine_N 125, and other VMs, provided by the cloud platform and having application components running on top of them. In one embodiment, the execution of the application components, such as Application Component 1 135, can record log messages. In another embodiment, the recorded log messages can be interpreted as logged data describing the behavior of a running software component, a software application, or a software system. The logged data may correspond to logger objects that are inserted in the programming code of the Application Component_1 135. The logged data can be stored on a server running on a VM, such as the Virtual Machine_1 115, Virtual machine_2 120, etc. After processing the request from the client 105, the Cloud Platform Monitoring System 110 may provide the requested logged data for the defined application components. For example, the logged data may be provided over HTTP communication channel and displayed by a client in a web browser.

Figure 2:
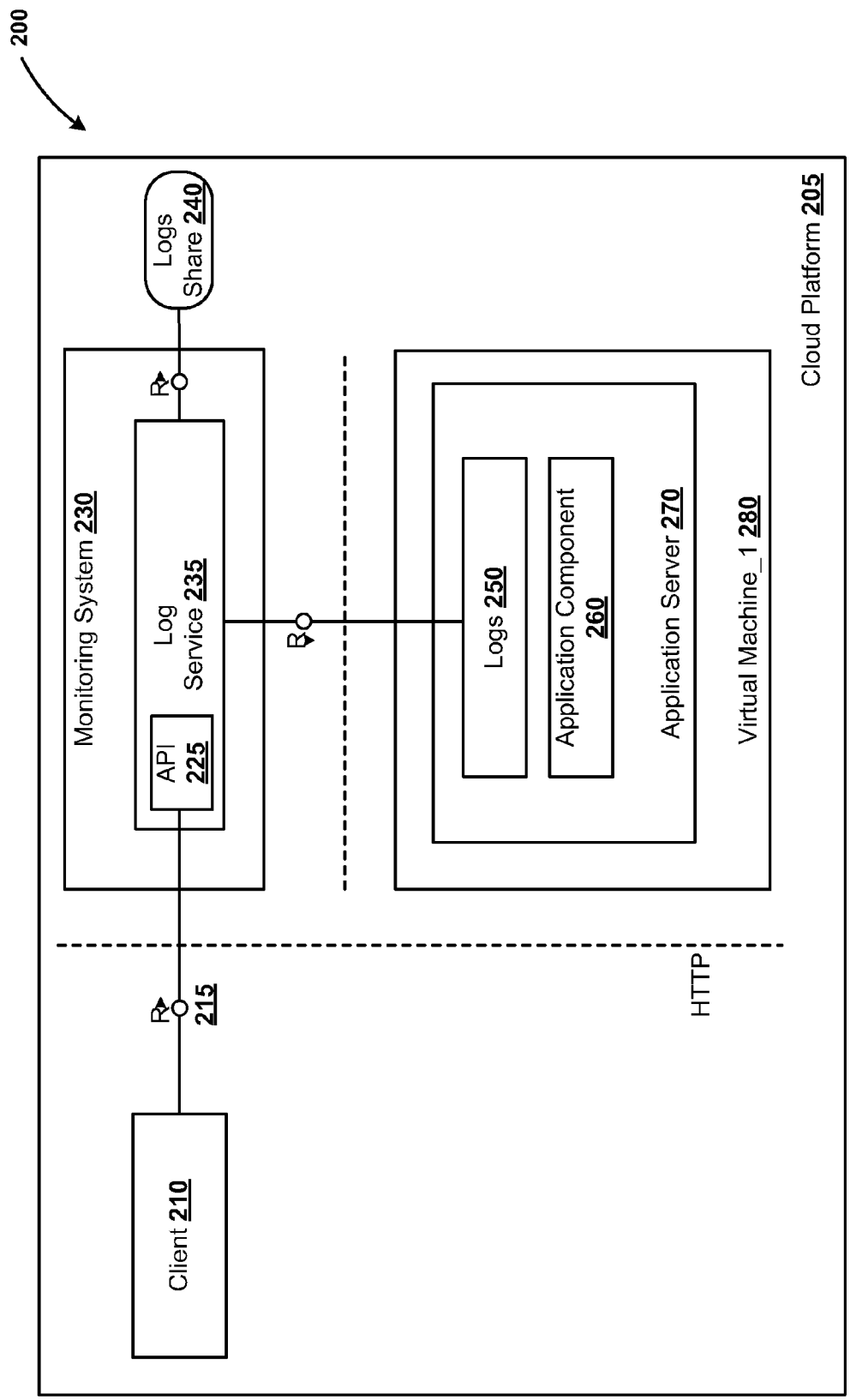
FIG. 2 is a block diagram illustrating an embodiment of an environment for providing application logs remotely using interfaces provided by a cloud platform.

FIG. 2 is a block diagram illustrating an embodiment of an environment 200 for providing application logs remotely using interfaces provided by a cloud platform 205. When a software application is deployed and started, it becomes accessible to end users. When the software application is deployed as a web application on a cloud computing platform, it is provided to the end users as a SaaS. Software applications and their application components are deployed and started on a cloud runtime infrastructure, for example, provided by the cloud platform. When a single application is started on the cloud platform, the comprised application components are started on application servers installed on separate VMs. For example, Virtual Machine_1 280 has an Application Server 270 on it, and Application Component 260 is installed on the Application Server 270. The Application Component 260 may represent a whole application or may be part of an application (e.g. an application component) that contains other application components. In one embodiment, the implementation of the Application Component 260 may include logging of data, such as logging messages during the execution of the application that contains the component. The logged data may be configured and stored on the Application Server 270. In one embodiment, block Logs 250 may contain application log messages, stored for the application component 260. Logs 250 may include application log data stored since the last start of the Application Component 260. In one embodiment, the Logs 250 may be transferred by a Log Service 235 in the Monitoring System 230 to a Logs Share 240. The transfer can be performed on a regular basis. In another embodiment, the Logs Share 240 may store logged data for application components during their whole lifecycle, for example, for all the periods while they were running, not only for the last period of time since they were started. Therefore, the Logs Share 240 may include long-term history of the logged messages for application components and applications deployed on the cloud platform 205.

In one embodiment, the cloud platform 250 can provide a monitoring system 230 that includes the Log Service 235. The Log Service 235 can expose an API (Application Programming Interface) 225 which can be accessed by external units, such as a client 210. The API 225 may represent a specification that defines the communication between software components. In one embodiment, the API can provide interfaces that allow operations like listing available log files for deployed application components, getting a specified log file, etc. These operations can support authentication and authorization features. The service can serve responses to the client's calls that request logged data for defined application components or applications. The calls made from the client 210 can be received over a remote communication channel 215, for example, based on HTTP. The exposed API 225 can include an interface, which can be a programming interface. In one embodiment, the implementation of the interface retrieves logged data for the requested application components or applications. For example, a client 210 may request from the Log Service 235 the logged data for the Application Component 260. The Log Service 235 provides the API 225 where the interface is instantiated and can serve requests from the client 210. The retrieved requested logged data can be provided to the client 210. For example, the logged data may be provided for downloading in a file format, or presented in a web browser.

In one embodiment, the design and implementation of the Log Service 235 can be based on a Representational State Transfer (REST) architecture style. REST defines a set of architectural principles by which one can design a service (web service) that is concentrated on resources that are transferred over HTTP. REST principles can be applied with a wide range of clients written in different programming languages. Web services that are based on the REST architecture style (also called RESTful Web services) use HTTP method explicitly and in a way consistent with the protocol definition. With RESTful services, there is a one-to-one mapping between create, read, update, and delete operations and HTTP methods. For example, when retrieving a resource, a GET method is used. RESTful Web services expose directly structure-like Uniform Resource Identifiers (URIs). The Log Service 235 can be designed as a RESTful service, which exposes an API to various clients that can be built on top of it to present application log files (logged data) to end users (e.g. application developers). In one embodiment, an end user may request logged data by using a web browser. In another embodiment, a custom application or a mobile application may be developed in such a manner that they use the logging functionality provided by the Log Service 235.

The API specification may define methods that can be used. If the API is a REST API, the REST API specification may provide description of the HTTP methods that are available and a path that can be used for a Uniform Resource Location (URL)-based request. Table 1 presents a specification for two exemplary methods provided by a REST API. These methods can provide remotely application logs for cloud deployed applications and application components for an authenticated and authorized user of an account on a cloud platform (such as the cloud platform 102, FIG. 1). The specification may further describe the possible HTTP response codes, which can be returned to the client that requested the logged data. For example, the response code can be "200", which means that the request has succeeded. If the response code is "401", this means that the request was unauthenticated. Response code "403" represents a response when the user (client) is not allowed to access the logged data that is requested for the account/application/component.

TABLE 1

| HTTP Method | Request Path | Description | Possible Response Codes |
|---|---|---|---|
| GET | /:account/:application/:component | Returns all log files for a given application component identified by /:account/:application/:component | "200", "401", "403", "404" |
| GET | /:account/:application/:component/:file | Returns the content of a given log file within a given application component | "200", "401", "403", "404 |

The request path is described with parameters—account, application, component, and file. Table 2 presents description of the used parameters in the path.

TABLE 2

| Parameter | Type | Possible Values | Description |
|---|---|---|---|
| :account | String | Valid and existing account | Name of the account for which logs are requested to be retrieved |
| :application | String | Valid and existing application | Name of the application for which logs are requested to be retrieved |
| :component | String | Valid and existing component | Name of the component for which logs are requested to be retrieved |
| :file | String | Valid and existing file name | Name of the log file to be retrieved |

Table 3 presents a sample output that can be returned to the client after requesting logged data using the GET method and applying it to a provided URL. For example the URL can be—"https://<monitoring system>/log/api/logs/<path>". Table 3 presents the output for a request made in the following form: "https://<monitoring system>/log/api/logs/acme/ prjmgmt/web", which represents a request for account "acme", for application "prjmgmt", and for application component "web". In one embodiment, the output may be provided in Java Script Object Notation (JSON) format.

TABLE 3

```
{
    "account":"acme",
    "application":"prjmgmt",
    "component":"web",
    "logs":[
        {
            "name":"ljs_trace_2011-06-21.log",
            "description":"default trace",
            "size":436031,
            "lastModified":"Jun 21, 2011 9:30:41 PM"
        },
        {
            "name":" http_access_2011-08-13.log",
            "description":"HTTP access log",
            "size":123787,
            "lastModified":"Aug 13, 2011 5:12:16 PM"
        }
    ]
}
```

If a request, which includes the file name, is made (for example "https://<monitoring-system>/log/api/logs/acme/prjmgmt/web/ljs_trace_2011-06-21.log"), the response may include an archived version of the log file.

Figure 3:
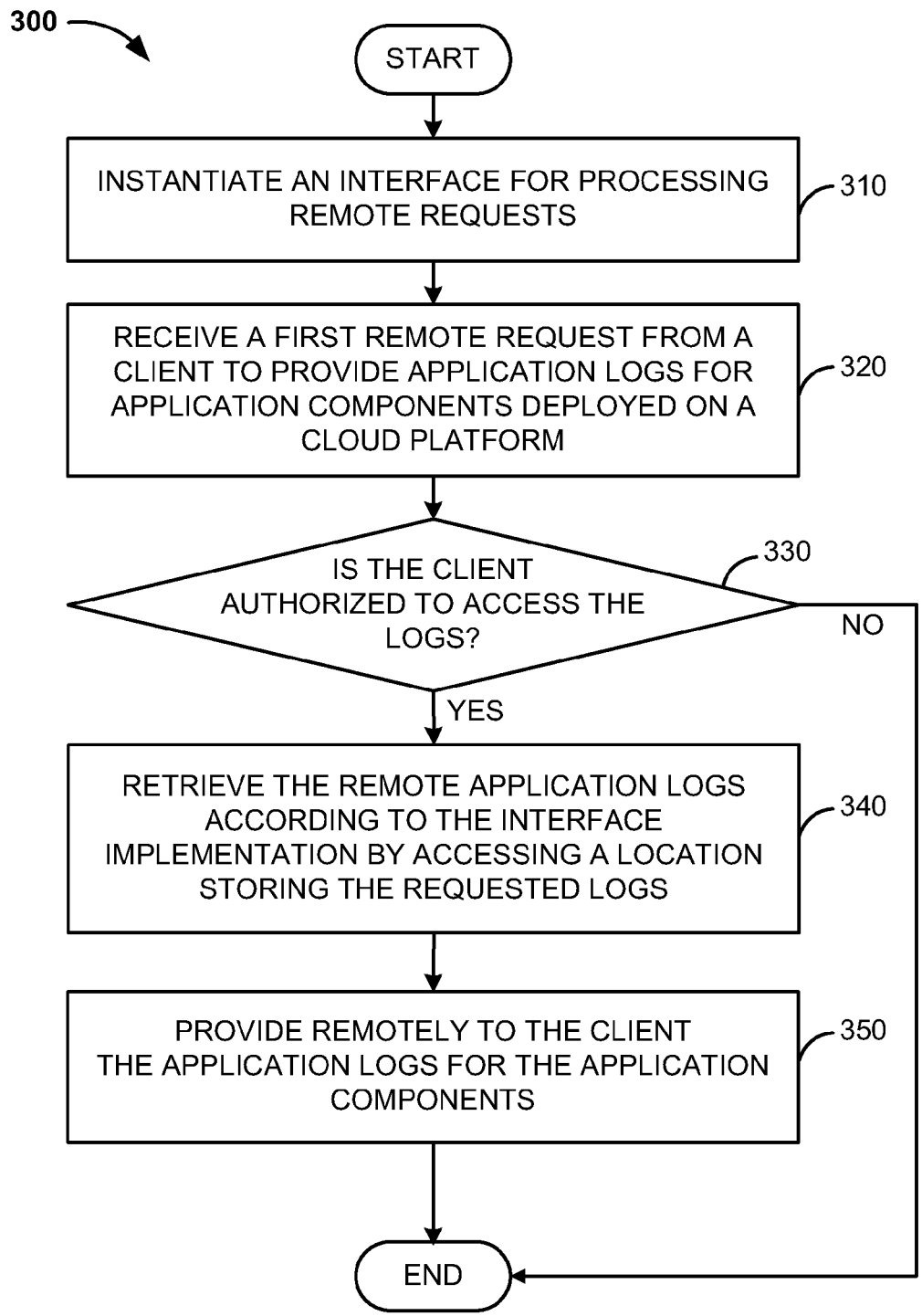
FIG. 3 is a block diagram illustrating an embodiment of a method for providing remotely logged data for one or more application components deployed on a cloud platform.

FIG. 3 is a block diagram illustrating an embodiment of a method 300 for providing remotely logged data for one or more application components deployed on a cloud platform. At process step 310, an interface is instantiated to process remote requests. The interface can be provided by the cloud platform, for example, from the Cloud Platform Monitoring System 110 in FIG. 1. A first remote request is received from a client at process step 320. The remote request can be received over a remote communication channel based on an application protocol, such as HTTP. The first remote request may specify application components. In another embodiment, the first remote request may specify an application that includes one or more application components. The remote request is received by the instantiated interface. At decision block 330, it is determined whether an account that is used by the client has access rights to the logged data for the requested application components or application. If the client cannot be authenticated, the request for logged data cannot be handled by the interface. At process step 340, the client is authenticated and the requested logged data is retrieved according to the implementation of the instantiated interface. The implementation of the interface may access a location storing the requested application logs. In one embodiment, the application logs can be stored on the cloud runtime infrastructure, e.g. on the application servers installed on the VMs provided by the cloud platform. In another embodiment, the implementation of the interface may define the process of retrieving logged data from a network storage located on the cloud platform. The network storage may contain up-to date logged data that is obtained from the cloud runtime infrastructure that is used for deploying and starting the requested application components or applications. At process step 350, the requested logged data is provided remotely to the client. In one embodiment, the logged data can be provided for downloading in a file format. In another embodiment, the logged data can be presented in a web browser in a user-friendly way.

Figure 4:
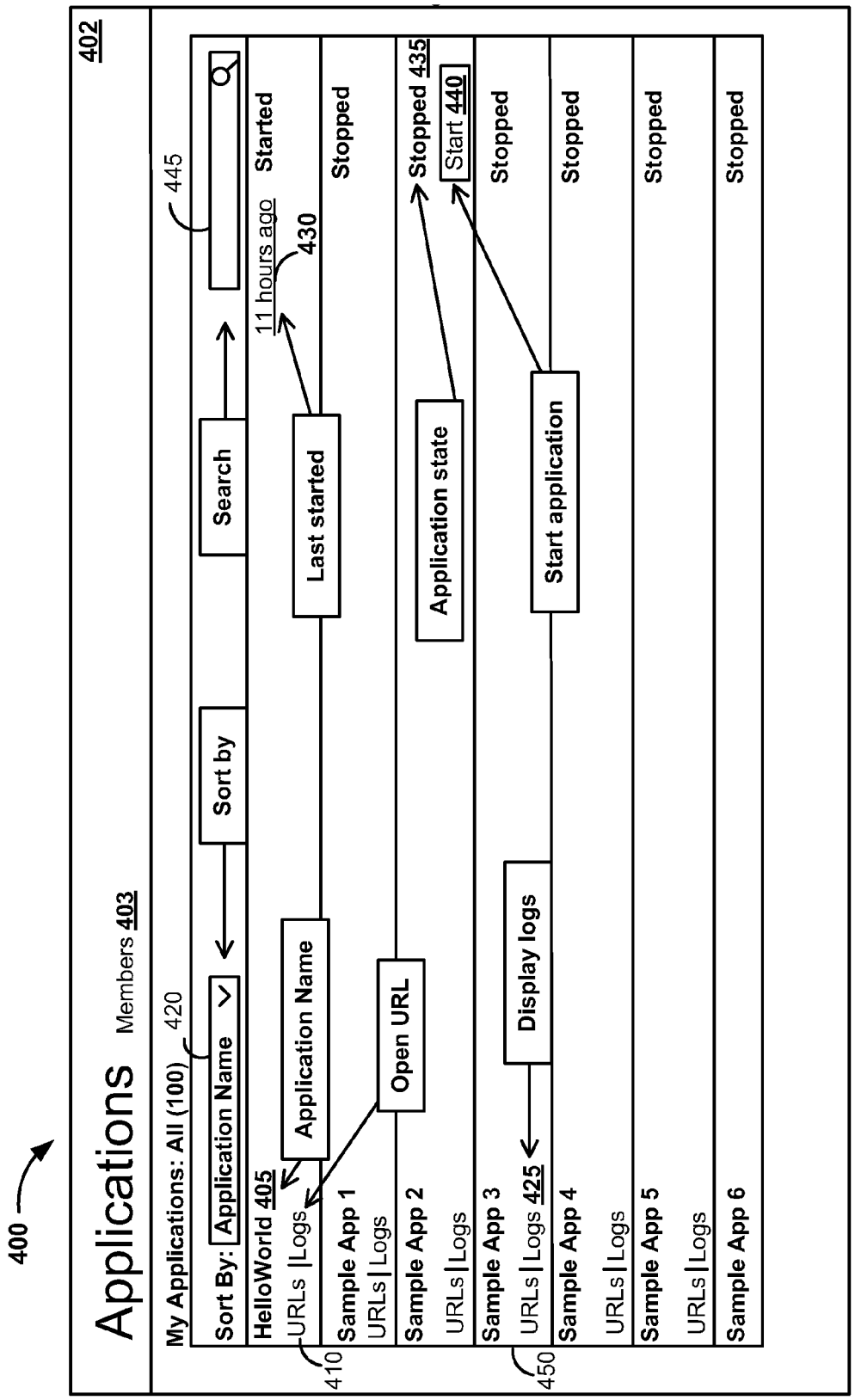
FIG. 4 is an exemplary screenshot, depicting an embodiment of environment of a client for sending requests to an instantiated interface provided by a cloud platform.

FIG. 4 is an exemplary screenshot, depicting an embodiment of environment 400 of a client for sending requests to an instantiated interface provided by a cloud platform. A web application 402 provides a user interface (UI) that presents applications deployed on the cloud platform. The web application 402 can have an authentication and authorization mechanism to present only the applications defined for an authorized account. In another embodiment, the web application 402 can define roles that have different access rights. Members (e.g. users) defined for the account can be presented by using the Members 403 page. The presented applications can be sorted according to different sort criteria defined in sort field 420. For example, a sort criteria entered in the sort field 420 can be the application name. An application can be searched by search criteria when entered in search field 445. Application 405 is displayed with an application name "HelloWorld". The time period since the last start of the application is presented in text field 430. The application state is also displayed in text field 435. The state of an application can be for example started, stopped, other. The web application 402 may provide options to start a stopped application by a push button 440 on the UI. For the application 405, there is a link 410 to URLs where the application can be accessed and a user may perform tasks with the working application. For example, for an application 450 with application name "Sample App 3" displayed in the UI, logged data can be requested by using a Logs 425 navigation link. When the Logs 425 navigation link is used, a request to the cloud platform is sent. For example, the request can be sent to a monitoring system, such as the Cloud Platform Monitoring System 110 in FIG. 1. The monitoring system can include a service that provides application logs when requested. The service may instantiate interfaces for processing remote requests for application logs. The service may also provide an API specifying the protocol of communication between the monitoring system and requestors.

Figure 5:
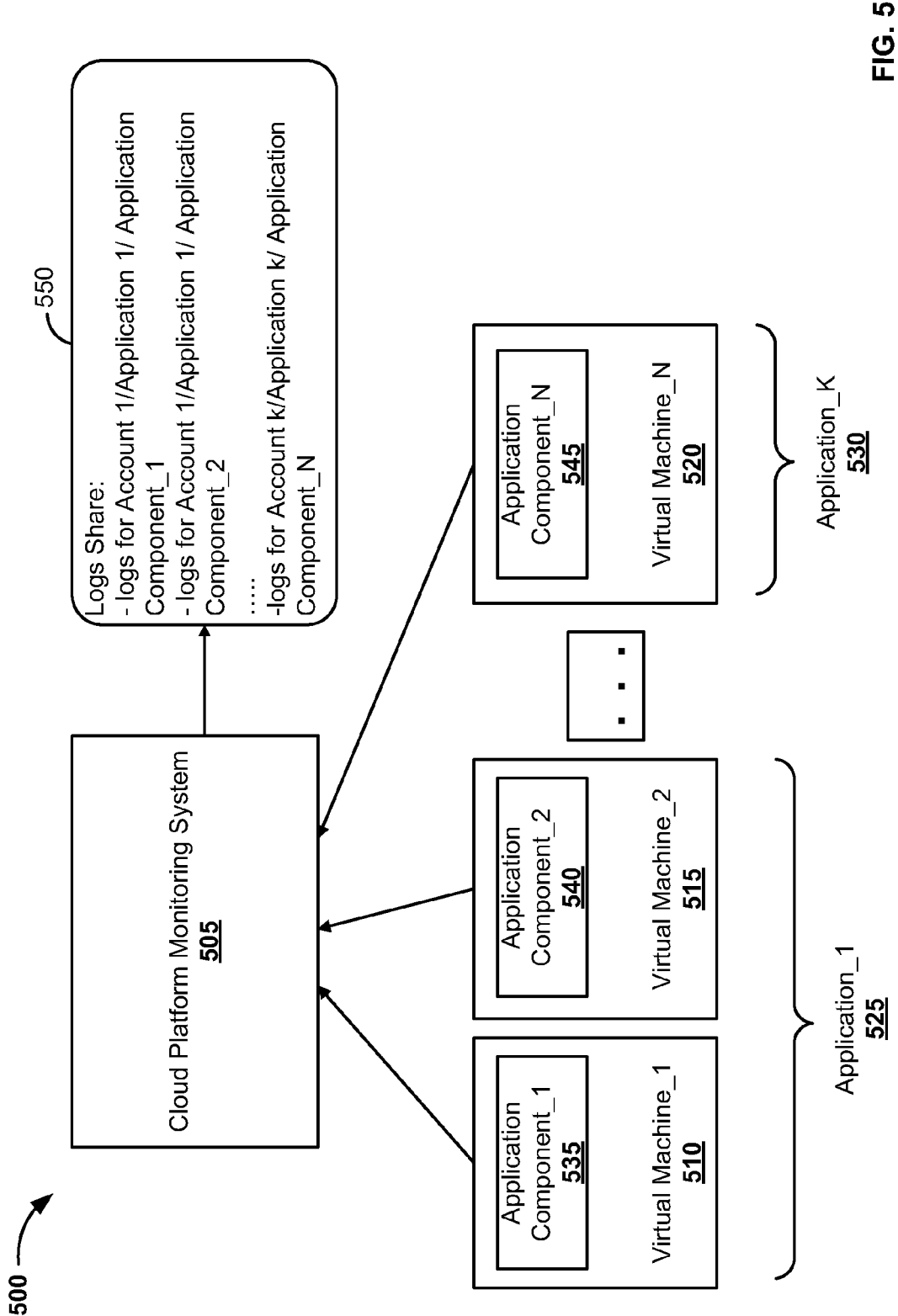
FIG. 5 is a block diagram illustrating an embodiment of an environment for storing application logged data for application components deployed on a cloud platform.

FIG. 5 is a block diagram illustrating an embodiment of an environment 500 for storing application logged data for application components deployed on a cloud platform. A Cloud Platform Monitoring System 505 can be provided by the cloud platform to facilitate the monitoring and to provide logged data for deployed application components on a cloud runtime infrastructure. Such application components can be Application Component_1 535, Application Component_2 540, and Application Component_N 545, which are installed on application servers that run respectively on Virtual Machine_1 510, Virtual Machine_2 515, and Virtual Machine_N 520. Application components can be combined to represent a software application. For example, the Application Component_1 535 and the Application Component_2 540 represent Application_1 525. In one embodiment, Account 1 may have deployed the Application_1 525. In another embodiment, Account k may have deployed the Application_k 530, which includes the Application Component_N 545. The account 1 may have access to the logged data for the Application Component_1 535 and the Application Component_2 540 only, and do not have access to the Application Component_N 545. The application servers can store the logged data. The Cloud Platform Monitoring System 505 may receive the stored logged data from the application servers.

In one embodiment, the Cloud Platform Monitoring System 505 may persist the received logged data on a Logs Share 550. The Logs Share 550 can be a network storage associated with the Cloud Platform Monitoring System 505. The logged data in the Logs Share 550 can be organized and grouped by accounts on the cloud platform. For example, for an account, the logged data can be arranged in a hierarchy structure organized by accounts, applications and application components. The Logs Share 550 can maintain up-to-date logged data by receiving regular portions of logged data from the virtual machines (Virtual Machine_1 510, etc.) coming through the Cloud Platform Monitoring System 505. The interval logged data may be sent from the VMs to the Logs Share 550 at different intervals. That is, the intervals can be set to different time period scenarios. For example, the update can be done every 10 seconds, one a day, etc.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
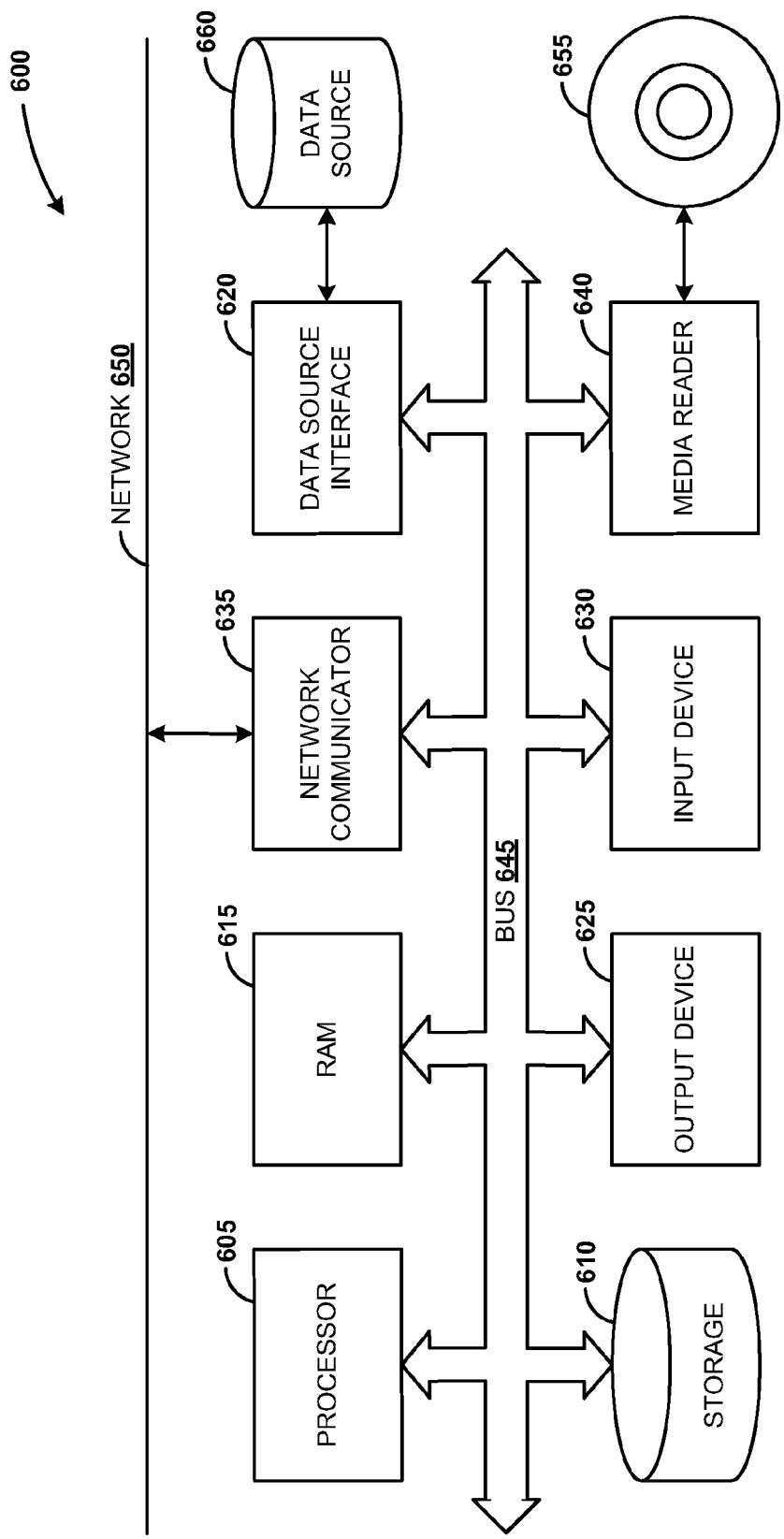
FIG. 6 is a block diagram illustrating an embodiment of a computing environment in which the techniques described for providing remote application logs for cloud applications can be implemented.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to provide remotely logged data for one or more application components deployed on a cloud routine infrastructure provided by a cloud platform, the method comprising:
   instantiating an interface for processing remote requests, wherein the interface is provided by the cloud platform;
   at the instantiated interface, receiving a first remote request from a client to provide the logged data for the one or more application components deployed on the cloud runtime infrastructure, wherein the requested logged data is generated on the cloud runtime infrastructure provided by the cloud platform, and the logged data describes behavior of the one or more application components;
   when the client is authorized to access the logged data, retrieving the requested logged data according to an implementation of the interface, wherein the implementation of the interface accesses a network storage on the cloud platform outside of the cloud runtime infrastructure storing the requested logged data, wherein the logged data is generated on the cloud runtime infrastructure during execution of the one or more application components and is transferred from the cloud runtime infrastructure to the network storage; and
   providing remotely to the client the retrieved logged data for the one or more application components.

2. The method of claim 1, wherein the first remote request from the client is received through a development environment provided by the cloud platform.

3. The method of claim 1, wherein the instantiated interface is based on a Representation State Transfer (REST) architecture style.

4. The method of claim 1, wherein the logged data is presented in a web browser.

5. The method of claim 1, further comprising determining authorization of the client to retrieve the requested logged data.

6. A computer system to provide remotely logged data for one or more application components deployed on a cloud runtime infrastructure provided by a cloud platform, the system comprising:
   a processor; and
   a memory in association with the processor storing instructions related to a log service module operable to:
      instantiate an interface for processing remote requests, wherein the interface is provided by the cloud platform;
      at the instantiated interface, receive a first remote request from a client to provide the logged data for the one or more application components deployed on the cloud runtime infrastructure, wherein the requested logged data is generated on the cloud runtime infrastructure provided by the cloud platform, and the logged data describes behavior of the one or more application components;
      when the client is authorized to access the logged data, retrieve the requested logged data according to an implementation of the interface, wherein the implementation of the interface accesses a network storage on the cloud platform outside of the cloud runtime infrastructure storing the requested logged data, wherein the logged data is generated on the cloud runtime infrastructure during execution of the one or more application components and is transferred from the cloud runtime infrastructure to the network storage; and
      provide remotely to the client the retrieved logged data for the one or more application components.

7. The system of claim 6, wherein the instantiated interface from the log service module is based on a Representation State Transfer (REST) architecture style.

8. The system of claim 6, wherein the first request from the client is received over a remote communication channel based on Hypertext Transfer Protocol (HTTP).

9. The system of claim 6, wherein the logged data is presented in a web browser.

10. The system of claim 6, wherein the memory further stores instructions related to a checking module to determine authentication and authorization of the client to retrieve the requested logged data.

11. An article of manufacture to provide remotely logged data for one or more application components deployed on a cloud runtime infrastructure provided by a cloud platform, comprising a non-transitory computer readable storage medium including executable instructions, which when executed by a computer, cause the computer to:
   instantiate an interface for processing remote requests, wherein the interface is provided by the cloud platform;
   at the instantiated interface, receive a first remote request from a client to provide the logged data for the one or more application components deployed on the cloud runtime infrastructure, wherein the requested logged data is generated on the cloud runtime infrastructure provided by the cloud platform, and the logged data describes behavior of the one or more application components;
   when the client is authorized to access the logged data, retrieve the requested logged data according to an implementation of the interface, wherein the implementation of the interface accesses a network storage on the cloud platform outside of the cloud runtime infrastructure storing the requested logged data, wherein the logged data is generated on the cloud runtime infrastructure during execution of the one or more application components and is transferred from the cloud runtime infrastructure to the network storage; and
   provide remotely to the client the retrieved logged data for the one or more application components.

12. The article of manufacture of claim 11, wherein the first remote request from the client is received through a development environment provided by the cloud platform.

13. The article of manufacture of claim 11, wherein the first request from the client is received over a remote communication channel based on Hypertext Transfer Protocol (HTTP).

14. The article of manufacture of claim 11, wherein the one or more application components form an application.

15. The article of manufacture of claim 11, wherein the logged data is presented in a web browser.

16. The article of manufacture of claim 11, further comprising instructions, which when executed by a computer, cause the computer to determine authorization of the client to retrieve the requested logged data.

* * * * *